UNITED STATES PATENT OFFICE.

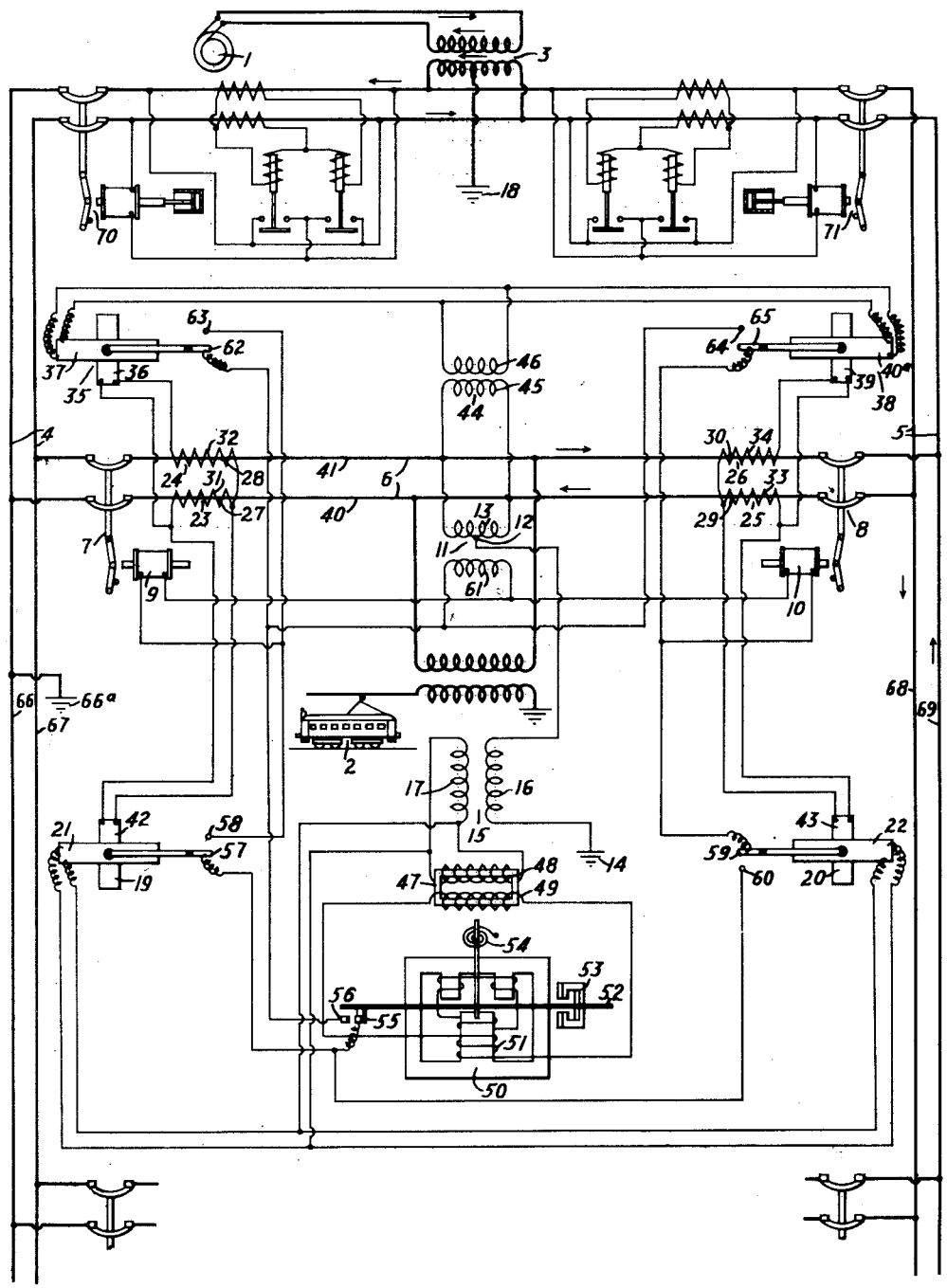

ALMON W. COPLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION FOR RAILWAY FEEDER-CIRCUITS.

1,349,365.   Specification of Letters Patent.   Patented Aug. 10, 1920.

Application filed March 8, 1917. Serial No. 153,293.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Systems of Distribution for Railway Feeder-Circuits, of which the following is a specification.

My invention relates to distributing systems and particularly to protective apparatus for parallel-connected feeder systems.

When a fault occurs in one of the feeder circuits of a distributing system having parallel-connected feeder circuits that supply power to the two ends of a load circuit, it is desirable to automatically disconnect both ends of the faulty circuit without interrupting the service on the load circuit. It has been customary to place automatic circuit interrupters at the generator end to disconnect the feeder circuit from the generator whenever a fault occurs thereon, but such disconnection will not prevent current from being fed to the fault through the load circuit.

By my invention, I provide means for automatically selecting and disconnecting the faulty circuit from the system.

The single figure of the accompanying drawing is a diagrammatic view of a system embodying one form of my invention.

In the figure, a generator 1 supplies power to a load 2 through a transformer 3, parallel feeder circuits 4 and 5 and a load circuit 6. Circuit interrupters 7 and 8 are inserted in the load circuit 6 adjacent to its respective ends. Trip coils 9 and 10 of the respective circuit interrupters 7 and 8 are energized through an auxiliary transformer 11, the midpoint 12 of the primary winding 13 of which is connected to ground 14 through the primary winding 16 of a shunt transformer 15. The midpoint of the secondary winding of the supply transformer 3 is also grounded at 18, either directly or through a limiting impedance.

The potential coils 21 and 22 of the respective reverse-energy relays 19 and 20 are connected, in parallel, to the secondary winding 17 of the transformer 15 in order that, whenever a potential is generated in the winding 17, the coils 21 and 22 may be energized by currents that are equal in value but opposite in direction.

The primary windings 27 and 28 of the respective series transformers 23 and 24 are inserted in the load circuit 6 adjacent to the circuit interrupter 7, and the primary windings 29 and 30 of the respective transformers 25 and 26 are inserted in that circuit adjacent to the circuit interrupter 8. The secondary windings 31 and 32 of the respective transformers 23 and 24 are connected in series with the current coil 36 of a reverse-energy relay 35 in such manner that, when currents of equal values are flowing in opposite directions in the two sides 40 and 41 of the load circuit 6, the currents from the secondary windings 31 and 32 will circulate from one transformer to the other and no current will flow in the current coil 42 of the relay 19, which is connected in shunt relation to the winding 31.

The primary winding 45 of a shunt transformer 44 is connected across the load circuit 6 and its secondary winding 46 is connected to the coils 37 and 40ᵃ of the respective relays 35 and 38 in parallel and in such manner that they will be of opposite polarity. The relays 35 and 38 may be provided with time-element devices but, since this is not new in the art, detailed illustration is deemed unnecessary.

A transformer 47, having its primary winding 48 connected in shunt relation to the winding 17 of the transformer 15, is so designed that its core will become magnetically saturated when the said winding is traversed by current of a relatively small predetermined value. The secondary winding 49 of the transformer 47 is connected in series with the coil 51 of a current relay 50 which has a movable disk 52 and a damping magnet 53 for effecting a predetermined time element in its operation. A spring 54 normally holds the contact member 55 of the relay 50 in an open-circuit position with respect to a contact member 56 but the force exerted by the spring 54 is overcome and the contact member 55 is moved to circuit-closing position when the coil 51 is energized.

Contact members 55 and 56 of the relay 50 and contact members 57 and 58 of the relay 19 are so connected in series between the trip coil 9 and the secondary winding 61 of the transformer 11 that it will be impossible to energize the coil 9 by closing the circuit through the contact members 57 and 58 until the circuit through the contact members 55 and 56 is closed. The coil 9 may also be energized by the closing of the circuit through the contact members 62 and 63 of the relay 35.

Two circuit breakers 70 and 71, respectively, with the necessary relays and series transformers, are so connected to the feeder circuits 4 and 5 that they will open at a predetermined value of current or when the currents in the two lines are not at the same magnitude, in a manner well known to those skilled in the art. Since the interrupters 70 and 71 have a larger time element in their operation than the interrupters 7 and 8 they will not operate until the latter have operated. The relays 20 and 38, series transformers 25 and 26, the trip coil 10 and the contact members 55 and 56, 59 and 60, and 64 and 65 are connected in the same manner, respectively, as the relays 19 and 35, the series transformers 23 and 24, the trip coil 9 and the contact members 55 and 56, 57 and 58, and 62 and 63.

Assuming that the conductors 66 and 68 are the positive conductors of the respective feeder circuits 4 and 5 and the conductors 67 and 69 are the negative conductors of the same feeder circuits, and assuming that the feeder circuit 4 is grounded at the point 66$^a$, current will flow through the conductor 66 of the feeder circuit 4 to the grounded point 66$^a$ and back to the generator 1 through the ground 18. Current will also flow through the grounded point 14, the transformer windings 16 and 13 and the load circuit 6 to the conductor 67 of the circuit 4 and the conductor 69 of the circuit 5 as shown by the arrows. Under these conditions, there will be more current flowing through the transformer 23 than through the transformer 24. Consequently, the difference between these two values of current will flow through the current coil 42 of the relay 19. In a similar manner, the current coil 43 of the relay 20 will be energized in the same direction.

A potential will be generated in the winding 17 that will energize the potential coil 21 of the relay 19 and the potential coil 22 of the relay 20 in opposite directions. The relay 19 being operatively energized, the circuit through the contact member 57 and 58 will close while the contact members 59 and 60 will remain open.

The potential generated in the winding 17 will also cause enough current to flow in the transformer winding 48 to saturate the transformer 47. Current will flow through the winding 49 and the winding 51, thus causing the relay to close the circuit through the contact members 55 and 56. This current will be of substantially the same magnitude, irrespective of the voltage impressed on the transformer 47 because the transformer becomes saturated at a relatively low value of current. Consequently, the relay 50 will have a substantially constant time element in its operation.

Since the circuit through the contact members 57 and 58 has already closed, the closing of the circuit through the contact members 55 and 56 will close the circuit between the trip coil 9 and the transformer winding 61. The trip coil 9 will thus be operatively energized and will open the circuit interrupter 7. And, since the circuit interrupters 70 and 71 have a greater time element in their operation, than the interrupter 7 and its associated relays, neither the circuit interrupter 70 nor the circuit interrupter 71 will operate until after the interrupter 7 has opened. After the interrupter 7 has opened, the circuit breaker 70 will open but the circuit breaker 71 will not open, since there is no longer an overload in the circuit 5. In a similar manner, a ground on the conductor 67 of the feeder circuit 4 will open the circuit interrupters 7 and 70, and a ground on either of the conductors 68 and 69 will open the interrupters 8 and 71.

If the conductors 68 and 69 become short circuited, current will flow through the transformers 25 and 26 in a direction opposite to the normal direction of the flow of current and the current in the coil 39 of the relay 38 will be reversed. The circuit through the contact members 64 and 65 will close after a predetermined time has elapsed. The trip coil 10 will be operatively energized and the circuit interrupter 8 will open, then the circuit interrupter 71 will open and the feeder 5 will be disconnected at both ends.

If, however, an overload occurs upon either of the feeder circuits, a heavy current will be caused to traverse the coils 27 and 28 although no difference in the current induced therein will occur. Upon such occurrence, therefore, the relays 35 and 38 will operate to close contacts 62 and 63, and 64 and 65, respectively, thus again completing the required circuit and causing the feeder in which the overload occurs to be disconnected from the system.

If there are a number of load circuits taking power from the same pair of feeder circuits, each load circuit will be equipped with protective apparatus similar to that of the load circuit 6.

I do not desire to limit my invention to the particular devices shown and described, as many modifications may be made therein without departing from the spirit and scope of my invention as set forth in the appended claims.

I claim as my invention:

1. In a system of distribution, the combination with a load circuit, feeder circuits for supplying power to the ends of said load circuit, and circuit interrupters inserted adjacent to the respective ends thereof, of relays for controlling the operation of said circuit interrupters, a winding connected to said load circuit and having a grounded neutral point, and means controlled by the variation of the potential of said neutral point, upon the occurrence of abnormal conditions in the feeder circuits, for properly energizing the relays to selectively actuate the said circuit interrupters.

2. In a system of distribution, the combination with a load circuit, feeder circuits for supplying power to the ends of said load circuit, and circuit interrupters adjacent to the respective ends thereof, of relays for controlling the operation of said circuit interrupters, a winding connected to said load circuit and having a grounded neutral point, and means jointly controlled by the variation of the potential of said neutral point, upon the occurrence of abnormal conditions in the feeder circuits and by unequal currents obtaining in the two sides of said load circuit, for properly energizing the relays to selectively actuate the said circuit interrupters.

3. In a system of distribution, the combination with a load circuit, feeder circuits for supplying power to the ends of said load circuit, and circuit interrupters adjacent to the respective ends thereof, of a winding connected to said load circuit and having a grounded neutral connection, and means, jointly controlled by the current flow in said grounded connection and unequal currents obtaining in the two sides of said load circuit for selectively and automatically actuating the said circuit interrupters.

4. In a system of distribution, the combination with a load circuit, feeder circuits for supplying power to the ends of said load circuit, and circuit interrupters inserted adjacent to the respective ends thereof, of a winding connected to said load circuit and having a grounded neutral connection, and means, jointly controlled by the current flow in said grounded connection and unequal currents obtaining in the two sides of said load circuit, for selectively and automatically actuating the said circuit interrupters after a predetermined time interval.

5. In a system of distribution, the combination with a load circuit, feeder circuits supplying power to the ends of said load circuit, and circuit interrupters in the respective ends thereof, of a winding connected to the load circuit and having a ground connection, relays for actuating said circuit interrupters, and means for operatively energizing said relays when unequal currents in the two sides of said load circuit coexist with a current flow in said ground connection, whereby the circuit interrupters may be selectively actuated.

6. In a system of distribution, the combination with a load circuit, a plurality of feeder circuits for supplying power to the ends of said load circuit, and circuit interrupters adjacent to the respective ends thereof, of relays for actuating the circuit interrupters, a winding having a grounded connection connected to said load circuit and operatively associated with said relays, and series transformers at the respective ends of the load circuit, the secondaries thereof forming a closed circuit with each other and connected in shunt to the relays for selectively energizing the relays when a fault occurs on one of the feeder circuits.

7. In a system of distribution, the combination with a load circuit, a feeder circuit supplying power to the two ends of said load circuit, and circuit interrupters in the respective ends thereof, of series transformers connected in both sides and the respective ends of said load circuit, a winding having a grounded connection connected to the load circuit, and relays operatively energized by the conjoint action of the flow in said grounded connection and unbalanced currents obtaining in adjacently disposed series transformers for automatically and selectively actuating said circuit interrupters.

8. In a system of distribution, the combination with a load circuit, feeder circuits for supplying power to the two ends of said load circuit, and circuit interrupters in the load circuit adjacent to the respective ends thereof, of relays for selectively actuating the circuit interrupter that is adjacent to the feeder circuit in which a fault develops comprising a grounded winding connected to the load circuit, means for operatively actuating said relays, and additional relays having a predetermined time element so connected that they render the said first relays inoperative until a predetermined time has elapsed.

9. In a system of distribution, the combination with a load circuit, feeders connected to the ends thereof, and circuit interrupters inserted between said load circuit and said feeders, of selective means having a predetermined time element for actuating that circuit interrupter which is adjacent to an affected feeder, upon the occurrence of a ground thereon, said means having the same time element, irrespective of the resistance of the ground on said affected feeder.

In testimony whereof, I have hereunto subscribed my name this 27th day of Feb., 1917.

ALMON W. COPLEY.